(12) United States Patent
Evans et al.

(10) Patent No.: US 7,954,843 B2
(45) Date of Patent: Jun. 7, 2011

(54) TWO SHOT AUTOMOTIVE PSIR CHUTE (75) Inventors: Gregg S. Evans, Windsor (CA);
Matthew Gabriel, Shelby Township, MI (US)

(73) Assignee: Intertec Systems, L.L.C., Plymouth, MI (US)

( * ) Notice: Subject to any disclaimer, the term of this patent is extended or adjusted under 35 U.S.C. 154(b) by 0 days.

(21) Appl. No.: 12/706,689

(22) Filed: Feb. 16, 2010

(65) Prior Publication Data
US 2010/0207366 A1 Aug. 19, 2010

Related U.S. Application Data (60) Provisional application No. 61/153,017, filed on Feb. 17, 2009.

(51) Int. Cl.
*B60R 21/20* (2006.01)

(52) U.S. Cl. ..................................... 280/728.3

(58) Field of Classification Search ............... 280/728.3, 280/732
See application file for complete search history.

(56) References Cited

U.S. PATENT DOCUMENTS

| | | | | |
|---|---|---|---|---|
| 7,007,970 B2 * | 3/2006 | Yasuda et al. | ............. | 280/728.3 |
| 7,093,849 B2 * | 8/2006 | Nishijima et al. | ......... | 280/728.3 |
| 7,425,018 B2 * | 9/2008 | Suwama et al. | ........... | 280/728.3 |
| 7,556,285 B1 * | 7/2009 | Hayashi | .................... | 280/728.3 |
| 2008/0211208 A1 | 9/2008 | Evans | | |
| 2009/0243265 A1 | 10/2009 | Evans et al. | | |

* cited by examiner

*Primary Examiner* — Faye M. Fleming
(74) *Attorney, Agent, or Firm* — Dykema Gossett PLLC (57) ABSTRACT

An automotive PSIR hidden chute assembly contained behind an automotive instrument panel. The PSIR may include chute forward and rearward doors, first and second chute flanges, and an instrument panel, each constructed of a first hard material, and first and second chute hinges, first and second chute sidewalls and a chute end wall, each constructed of a second tough ductile material, such that the first material and the second material have different thermal expansion properties and different elastic modulus properties.

18 Claims, 6 Drawing Sheets

TWO SHOT AUTOMOTIVE PSIR CHUTE

CROSS-REFERENCE TO RELATED APPLICATION(S)

This application claims the benefit of provisional patent application U.S. Ser. No. 61/153,017, filed Feb. 17, 2009, which is expressly incorporated herein by reference.

BACKGROUND OF INVENTION a. Field of Invention

The invention relates generally to automotive instrument panels having automotive Passenger Side Inflatable Restraint (PSIR) components, and more particularly, the invention relates to a two shot automotive PSIR chute.

b. Description of Related Art

Automobiles are commonly equipped with airbags for reducing driver and passenger injuries in the case of an accident. Automobile airbags are generally located in areas where a driver or passenger would potentially contact an automobile interior in the event of an accident. Airbags can reduce injuries by providing a substantially non-solid surface for the driver or passenger to contact, as opposed to the generally solid surfaces of the automotive interior. Although the functionality of the airbag is greatly valued, the visual appeal of the instrument panel, and invisibility of the airbag system are also of value to automobile manufacturers and consumers alike, as it leaves the general surface styling uninterrupted.

Figure 1:
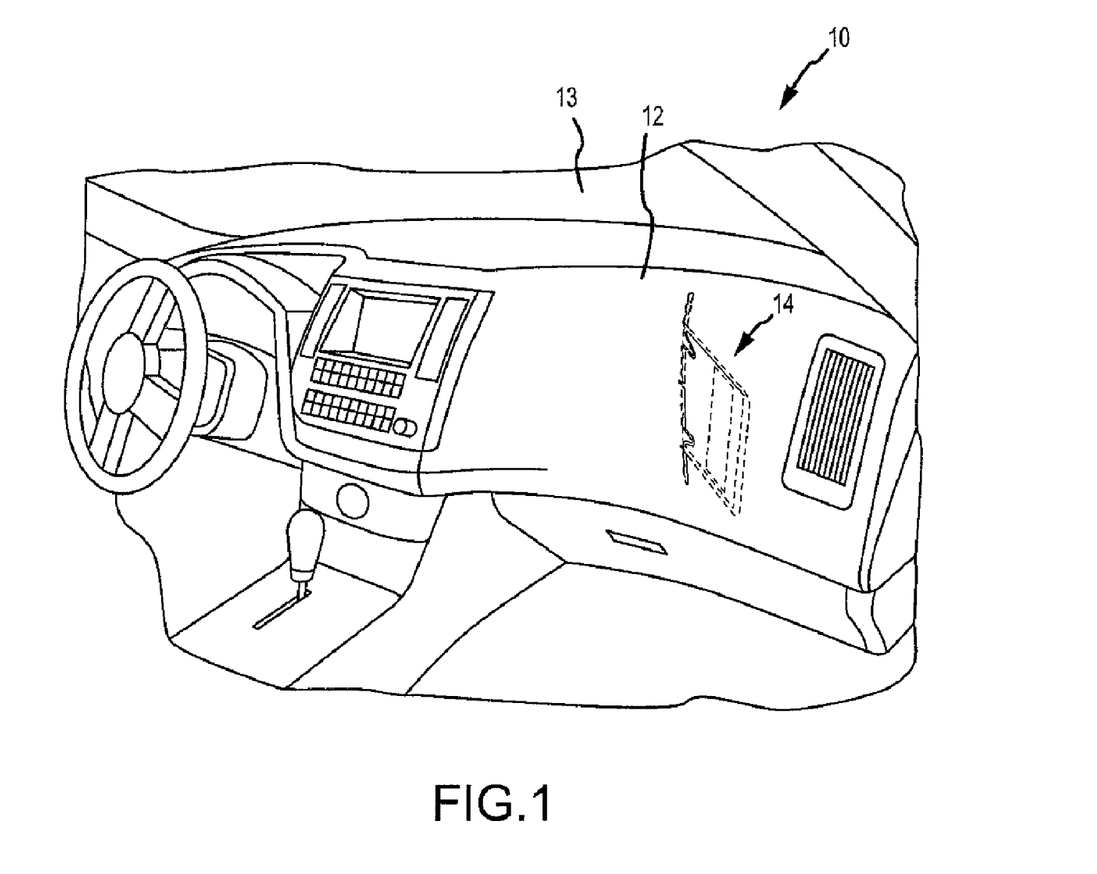
FIG. 1 is an environmental perspective view of an exemplary instrument panel containing a section view of a conventionally mounted Passenger Side Inflatable Restraint (PSIR) chute assembly.

In order to install an airbag, the airbag is generally folded into a module that is installed into and behind an automotive instrument panel component. The module housing a Passenger Side Inflatable Restraint (PSIR) is generally installed on the underside of an instrument panel, with a PSIR chute between the instrument panel and PSIR module. The instrument panel generally has pre-weakened lines that are invisible when viewed from the top, forming one or two doors allowing the airbag to release therethrough. A PSIR chute assembly is typically bonded to the instrument panel and generally includes chute doors behind PSIR doors, where the PSIR doors line up with the pre-weakened lines on the instrument panel. For example, FIG. 1 is an environmental perspective view of an automobile interior 10 having an exemplary instrument panel 12 and windshield 13, where the instrument panel 12 contains on its underside a sectional view of a conventionally mounted PSIR chute assembly 14.

Figure 2:
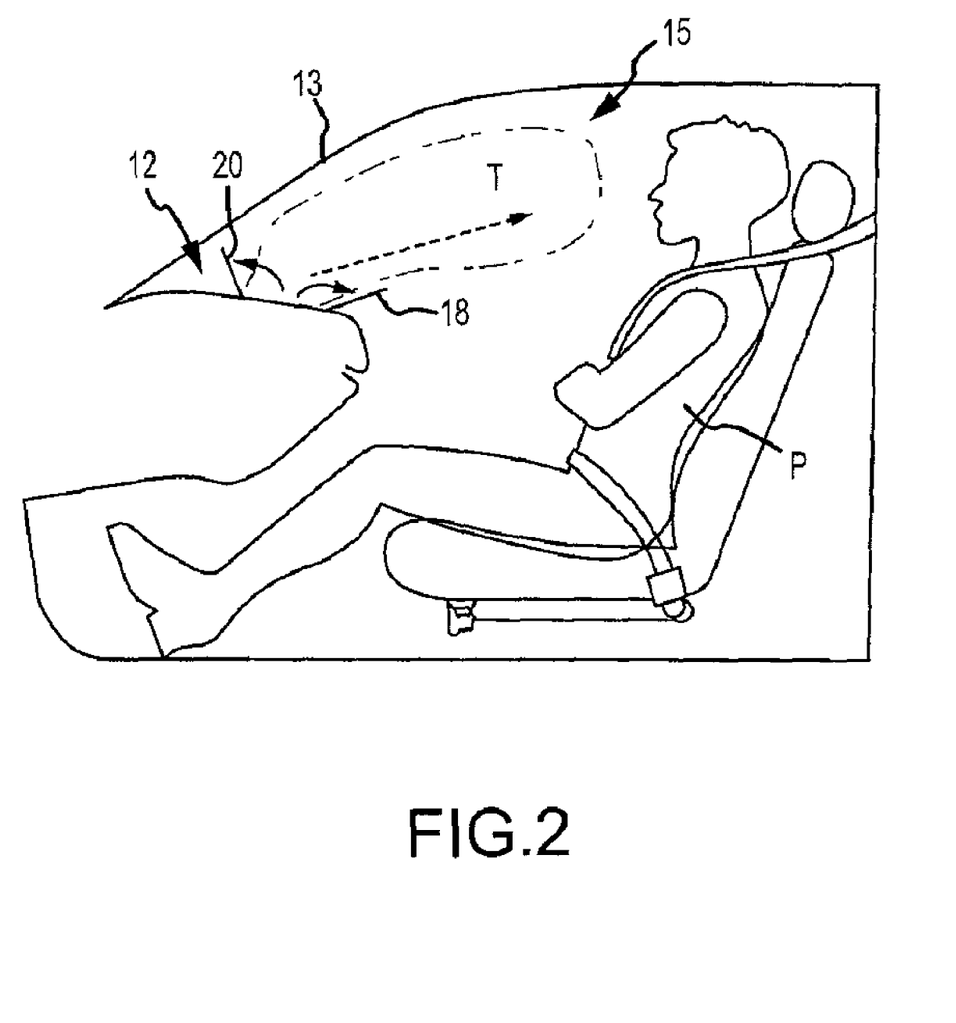
FIG. 2 is a diagram illustrating the deployment characteristics of a PSIR air bag.
Figure 3:
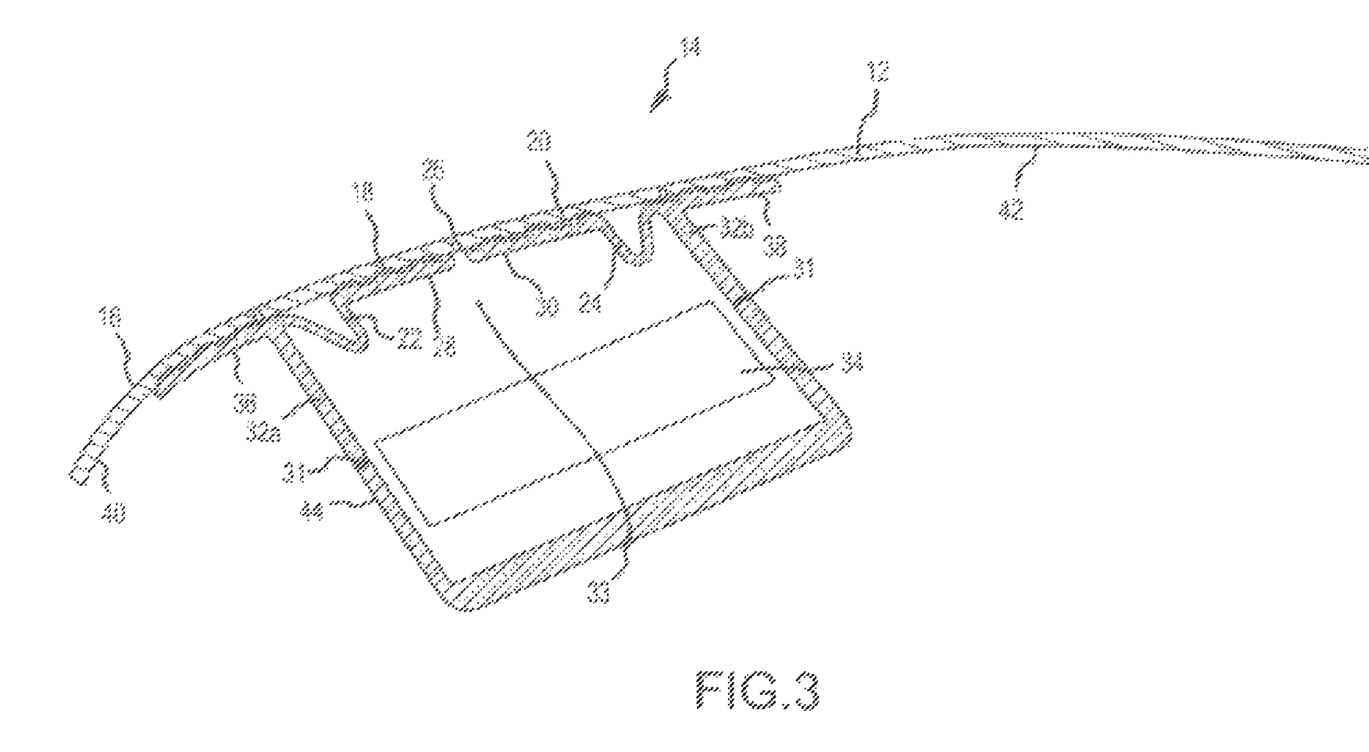
FIG. 3 is a sectional perspective view of a conventional prior art PSIR chute assembly.

FIG. 2 is a diagram illustrating exemplary deployment characteristics of a typical PSIR air bag. Referring to FIG. 2, a passenger P is positioned on the passenger side of an automobile interior in front of instrument panel 12 and windshield 13, and deployed airbag 15 must open at a substantially oblique trajectory T relative to PSIR rearward door 18 and PSIR forward door 20. Referring to FIG. 3, a sectional perspective view of a conventional PSIR chute and airbag module assembly 14 is shown. Chute and airbag module assembly 14 is located behind instrument panel 12 having an instrument panel outer layer 16 and behind PSIR rearward door 18 and PSIR forward door 20 and coupled at center score line 26.

PSIR chute assembly 14 includes a first chute hinge 22 hingedly connected to a chute rearward door 28 and includes a second chute hinge 24 hingedly connected to a chute forward door 30. Chute rearward door 28 is located substantially directly behind PSIR rearward door 18, and chute forward door 30 is located substantially directly behind PSIR forward door 20. Chute assembly 14 further includes chute sidewalls 32a, 32b, and chute end wall 33 connected by connectors 31, and contains and guides an airbag 34. Airbag 34 is contained within chute sidewalls 32a, 32b, and chute end wall 33, and is deployed through chute doors 28, 30 and PSIR doors 18, 20 upon deployment. Chute assembly 14 further includes a first chute flange 36 and a second chute flange 38. Chute assembly 14 is attached to an inner layer 40 of instrument panel 12 at chute doors 28, 30 and chute flanges 36, 38.

A conventional single layer injection molded instrument panel is typically made of a first material comprised of a hard plastic material which is somewhat brittle at cold service temperatures (less than 25° Fahrenheit), such as thermoplastic polyolefin (TPO), blended polypropylene material, polycarbonate, polyethylene based polyolefin plastic, urethane or another suitable plastic. FIG. 3 shows a conventional construction of a typical single shot injection molded chute where chute doors 28, 30, chute hinges 22, 24, chute sidewalls 32a, 32b, chute end wall 33, and chute flanges 36, 38 are made of a second material 44 comprised of a tough ductile material, such as a polypropylene or polyethylene blended with rubber or a polycarbonate or another suitable ductile material.

The thermal expansion properties (a substance's tendency to change in volume in response to a change in temperature) and elastic modulus properties (a substance's tendency to be deformed elastically when a stress force is applied to it) of the conventional PSIR chute assembly material and the conventional instrument panel material are different and can result in warping, distortion, and uneven compression when the chute assembly and instrument panel are exposed to temperature changes and stress forces. For example, a known method for attaching a PSIR chute assembly to an instrument panel may include vibration welding the PSIR chute to the instrument panel. Vibration welding joins components by "rubbing" them together, creating heat through the friction, melting the connection points, and applying/holding pressure until the components cool together, thereby welding the components at the connection points. Welding melts the connection points between the instrument panel and PSIR chute assembly, thus causing the volume of the melted instrument panel and PSIR chute material to shrink relative to the other surrounding material and to shrink unevenly relative to each other. During the cooling process, there is known to be further shrinkage/deformation of the materials. As such, during the known vibration welding of an instrument panel and a PSIR chute assembly, there can be visible deflection of the instrument panel at the connection points between the components caused by uneven shrinkage during the cooling process due to the materials having different thermal expansion and elastic modulus properties. The cooling process induces thermal shrinkage and stress in the connection points that can result in compression in such connection points and tension in the opposite visible areas of the instrument panel outer layer.

Moreover, known methods of constructing instrument panels and PSIR chute assemblies may result in damage to the outer layer of the instrument panel which often has a surface grain stipple. Such methods may produce high local loading that results in increases in the gloss level on the outer layer of the instrument panel stipple that is unacceptable without paint or additional cosmetic application procedures.

It would therefore be beneficial to provide an economical and efficient two shot automotive PSIR chute and method that addresses the issues with existing devices and methods and that minimizes and/or eliminates one or more of the above-identified deficiencies.

SUMMARY OF THE INVENTION

The invention overcomes the deficiencies of known PSIR chute assemblies by providing a two shot automotive PSIR chute. The advantages of the invention are numerous and include, but are not limited to, providing a PSIR chute assembly having chute doors and chute flanges constructed of the same material as the instrument panel, thus resulting in the chute doors and chute flanges having the same thermal expansion and elastic modulus properties as the instrument panel. The advantages further include providing a PSIR chute assembly that eliminates typical warping and distortion due to ambient temperature variation in the connection points between the instrument panel and the PSIR chute assembly, and/or providing a PSIR chute assembly that eliminates typical warping, distortion, and compression at the connection points between the instrument panel and the PSIR chute assembly that can result from vibration welding or other types of welding when the instrument panel and PSIR chute assembly are constructed. The advantages further include providing a PSIR chute assembly that improves the invisibility of the PSIR area in an instrument panel, and/or providing a PSIR chute assembly that allows for even compression at the connection points between the instrument panel and the PSIR chute assembly after vibration welding, thus preventing or eliminating surface warpage, distortion, and visibility. The advantages further include providing a PSIR chute assembly that resists stress caused by the weld process by joining components having similar thermal expansion and elastic modulus properties, and/or providing a PSIR chute assembly that enables unpainted instrument panel construction and achieves warpage and distortion control without damaging the surface grain stipple of the outer layer of the instrument panel because loading is more even during welding.

In an embodiment of the invention there is provided an automotive Passenger Side Inflatable Restraint (PSIR) hidden chute assembly contained behind an automotive instrument panel. The chute assembly may include a first chute hinge hingedly connected to a chute forward door and a second chute hinge hingedly connected to a chute rearward door, wherein the chute forward and rearward doors are attached to an inner layer of the instrument panel at a first set of connection points. The chute assembly may further include a first chute sidewall integral with the first chute hinge and extending down from the first chute hinge, a second chute sidewall integral with the second chute hinge and extending down from the second chute hinge, and chute end walls connecting the first chute sidewall to the second chute sidewall. The chute assembly may further include a first chute flange coupled to a top portion of the first chute sidewall and a second chute flange coupled to a top portion of the second chute sidewall, with the first and second chute flanges being attached to the inner layer of the instrument panel at a second set of connection points. The chute forward and rearward doors, the first and second chute flanges, and the instrument panel may all be constructed of a first hard material, and the first and second chute hinges, the first and second chute sidewalls and the chute end walls may all be constructed of a second tough ductile material, such that the first material and the second material have different thermal expansion properties and different elastic modulus properties. In an embodiment, the first material may include thermoplastic polyolefin (TPO), blended polypropylene material, polycarbonate, polyethylene based polyolefin plastic, urethane, or another suitable plastic. In an embodiment, the second material may include a tough ductile material such as a polypropylene or polyethylene blended with rubber or a polycarbonate or another suitable material.

In another embodiment of the invention there is provided a method of making an automotive instrument panel for eliminating warping, distortion, and compression at connection points between the instrument panel and an automotive Passenger Side Inflatable Restraint (PSIR) hidden chute assembly. The method may include the steps of providing an automotive instrument panel constructed of a first material, providing a PSIR chute assembly having chute forward and rearward doors, first and second chute flanges, all constructed of the first material, and having first and second chute hinges, first and second chute sidewalls, and chute end walls all constructed of a second material. The first and second materials have different thermal expansion properties and different elastic modulus properties. The method may further include welding an inner layer of the instrument panel to the chute forward and rearward doors, the first and second chute flanges of the PSIR chute assembly at connection points between the inner layer and the chute forward door, the chute rearward door, the first chute flange, and the second chute flange, such that the connection points resist stress caused by the welding and varying ambient temperatures evenly, thus eliminating any warping and distortion at the connection points resulting in visibility on a show surface of an end product. In an embodiment, the first hard material may include thermoplastic polyolefin (TPO), blended polypropylene material, polycarbonate, polyethylene based polyolefin plastic, urethane, or another suitable plastic. In an embodiment, the second material may include a tough ductile material such as a polypropylene or polyethylene blended with rubber or a polycarbonate or another suitable material. In an embodiment, the welding may be vibration welding.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Referring now to the drawings wherein like reference numerals designate corresponding parts throughout the several views, as discussed above, FIGS. 1-3 are views illustrative of conventional prior art automotive PSIR chute assemblies. In particular, FIG. 3 is a sectional perspective view of a conventional prior art automotive PSIR chute assembly 14. In FIG. 3, chute assembly 14, including chute hinges 22, 24, chute rearward door 28, chute forward door 30, chute sidewalls 32a, 32b, chute end walls 33, connectors 31, and chute flanges 36, 38, are shown to indicate that they are all part of a single injection molded component and that the chute is made of a different material than instrument panel 12 including PSIR rearward door 18 and PSIR forward door 20.

As discussed above, a conventional PSIR chute assembly including the chute doors, chute hinges, chute walls, and chute flanges is typically made in a single shot injection process of a tough ductile material such as a polypropylene or polyethylene blended with rubber or a polycarbonate or another suitable material. In contrast, instrument panel 12 may be typically made of a hard plastic material, such as thermoplastic polyolefin (TPO), blended polypropylene material, polycarbonate, polyethylene based polyolefin plastic, urethane, or another suitable plastic. The thermal expansion properties and elastic modulus properties of the tough rubber material of the conventional chute are different than the thermal expansion properties and elastic modulus properties of the hard plastic material of the conventional instrument panel.

Figure 4:
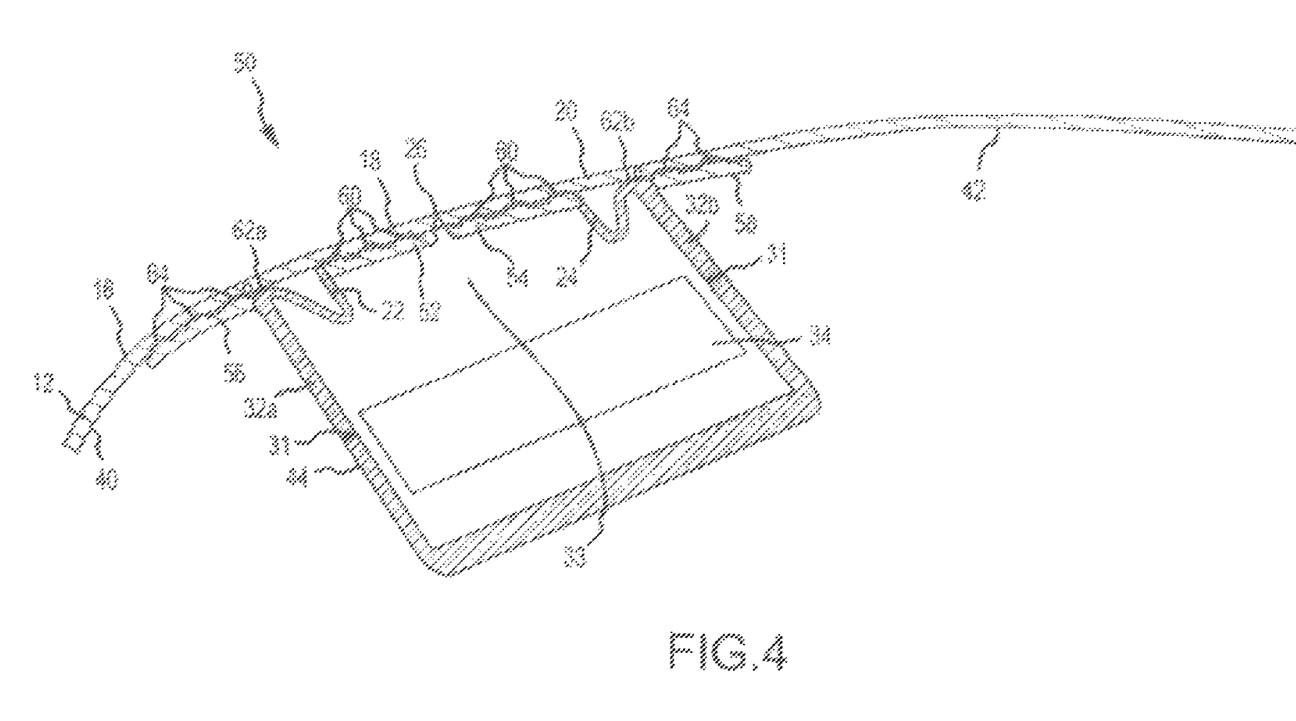
FIG. 4 is a sectional perspective view of an embodiment of the PSIR chute assembly of the invention.

FIG. 4 is a sectional perspective view of an embodiment of an automotive Passenger Side Inflatable Restraint (PSIR) hidden chute assembly 50 of the invention. Compared to conventional automotive PSIR chute assembly 14 of FIG. 3, the automotive PSIR chute assembly of FIG. 4 includes several significant benefits. PSIR chute assembly 50 may be located and contained behind automotive instrument panel 12 having instrument panel outer layer 16 and instrument panel inner layer 40. PSIR chute assembly 50 may also be located behind PSIR rearward door 18 and PSIR forward door 20 coupled at center score line 26. PSIR chute assembly 50 may include first chute hinge 22 hingedly connected to a chute rearward door 52 and includes second chute hinge 24 hingedly connected to a chute forward door 54. Chute rearward door 52 and chute forward door 54 are attached or bonded to inner layer 40 of instrument panel 12 at a first set of connection points 60 between chute doors 52, 54 and inner layer 40 of instrument panel 12. Chute rearward door 18 and chute forward door 20 may be attached through welding, such as vibration welding, to inner layer 40 of instrument panel 12 at the first set of connection points 60. Chute rearward door 52 is located substantially directly behind PSIR rearward door 18, and chute forward door 54 is located substantially directly behind PSIR forward door 20.

PSIR chute assembly 50 further comprises a first chute sidewall 32a integral with first chute hinge 22 and extending down from first chute hinge 22. PSIR chute assembly 50 further comprises a second chute sidewall 32b integral with second chute hinge 24 and extending down from second chute hinge 24. PSIR chute assembly 50 further comprises chute end walls 33 connected to first chute sidewall 32a and second chute sidewall 32b. Airbag 34 is contained within chute sidewalls 32a, 32b and chute end walls 33 and is deployed through chute doors 52, 54 and PSIR doors 18, 20 upon deployment. PSIR chute assembly 50 further comprises a first chute flange 56 coupled to a top portion 62a of first chute sidewall 32a and a second chute flange 58 coupled to a top portion 62b of second chute sidewall 32b. First chute flange 56 and second chute flange 58 are attached or bonded to inner layer 40 of instrument panel 12 at a second set of connection points 64 between chute flanges 56, 58 and inner layer 40 of instrument panel 12. Chute flanges 56, 58 may be attached through welding, such as vibration welding, to inner layer 40 of instrument panel 12 at the second set of connection points 64 (see FIG. 4).

Chute rearward door 52, chute forward door 54, first chute flange 56, and second chute flange 58, and instrument panel 12 may all be constructed of first material 42. First chute hinge 22, second chute hinge 24, first chute sidewall 32a, second chute sidewall 32b, and chute end wall 33 may all be constructed of second material 44. The first material and the second material may have different thermal expansion properties and different elastic modulus properties. In an embodiment, the first material may include thermoplastic polyolefin (TPO), blended polypropylene material, polycarbonate, polyethylene based polyolefin plastic, urethane or another suitable plastic. Thermoplastic olefin (TPO) refers to polymer/filler blends usually consisting of some fraction of polypropylene, polyethylene), block copolymer polypropylene, rubber, and a reinforcing filler. Common fillers may include, though are not limited to talc, fiberglass, or carbon fiber. TPO blends generally have densities of about 0.92-1.1. In an embodiment, the second material may include a tough ductile material such as a polypropylene or polyethylene blended with rubber or a polycarbonate or another suitable material.

In an embodiment of the invention, chute doors 52, 54 and chute flanges 56, 58 may be made of the same material as instrument panel 12 and PSIR doors 18, 20 which are integrated into instrument panel 12. In an embodiment, chute doors 52, 54 and chute flanges 56, 58 may be made of the first material including a hard plastic material, such as thermoplastic polyolefin (TPO), blended polypropylene material, polycarbonate, polyethylene based polyolefin plastic, urethane, or another suitable plastic. Chute doors 52, 54 and chute flanges 56, 58 may be made of any suitable hard plastic material, as long as it is the same material as instrument panel 12 and integrated PSIR doors 18, 20. Because chute doors 52, 54 and chute flanges 56, 58 are made of the same material as instrument panel 12, the thermal expansion properties, such as the coefficient of linear expansion, and the elastic modulus properties, such as stress and strain forces, of chute doors 52, 54 and chute flanges 56, 58 are the same as the thermal expansion properties, such as the coefficient of linear expansion, and the elastic modulus properties, such as the stress and strain forces, of the instrument panel and integrated PSIR doors 18, 20.

Being of the same material eliminates typical warping and distortion due to ambient temperature changes and weld stress at connection points 60, 64 between instrument panel 12 and chute doors 52, 54 and chute flanges 56, 58 of PSIR chute assembly 50, eliminates typical warping and distortion at connection points 60, 64 between instrument panel 12 and chute doors 52, 54 and chute flanges 56, 58 of PSIR chute assembly 50 that can result from vibration welding or other types of welding when instrument panel 12 and PSIR chute assembly 50 are constructed, allows for even compression at connection points 60, 64 between instrument panel 12 and chute doors 52, 54 and chute flanges 56, 58 of PSIR chute assembly 50 after vibration welding, thus preventing or eliminating surface warpage, distortion, and visibility, and evenly resists stress caused by the weld process by joining instrument panel 12 and chute doors 52, 54 and chute flanges 56, 58 having similar thermal expansion and elastic modulus properties.

Chute doors 52, 54 and chute flanges 56, 58 of PSIR chute assembly 50 may be attached or bonded to instrument panel 12 via vibration welding or another conventional welding or bonding process. Vibration welding generally attaches or joins chute doors 52, 54 and chute flanges 56, 58 of PSIR chute assembly 50 to instrument panel 12 by "rubbing" them together, creating heat through the friction, melting connection points 60, 64, and applying/holding pressure until chute doors 52, 54 and chute flanges 56, 58 of PSIR chute assembly 50 and instrument panel 12 cool together, thereby welding the components at connection points 60, 64. Welding melts connection points 60, 64 between chute doors 52, 54 and chute flanges 56, 58 of PSIR chute assembly 50 and instrument panel 12, thus causing the volume of chute doors 52, 54 and chute flanges 56, 58 and instrument panel 12 to shrink relative to the other surrounding parts.

Just after vibration welding, the melted material shrinks, thus inducing compression in instrument panel 12 and chute doors 52, 54 and chute flanges 56, 58. When the modulus of the two components (instrument panel and PSIR chute assembly) matches (and their cross-section), the compression will induce even compression. In addition, because chute doors 52, 54 and chute flanges 56, 58 and instrument panel 12 are all constructed of the same material, the stress caused by the weld process is resisted and this results in even compression and even shrinkage. Such even compression and even shrinkage of chute doors 52, 54 and chute flanges 56, 58 and instrument panel 12 prevents or eliminates surface warpage, distortion, and visibility. Additionally stresses and distortion may result due to any difference in the coefficient of thermal expansion between the materials present at connection points 60, 64 as the ambient temperature changes in service. This stress and distortion is prevented by the innovative use of the same material at connection points 60, 64 and limiting the use of the second material to first chute hinge 22, second chute hinge 24, first chute sidewall 32a, second chute sidewall 32b, and chute end walls 33, where loading is much higher.

Figure 5:
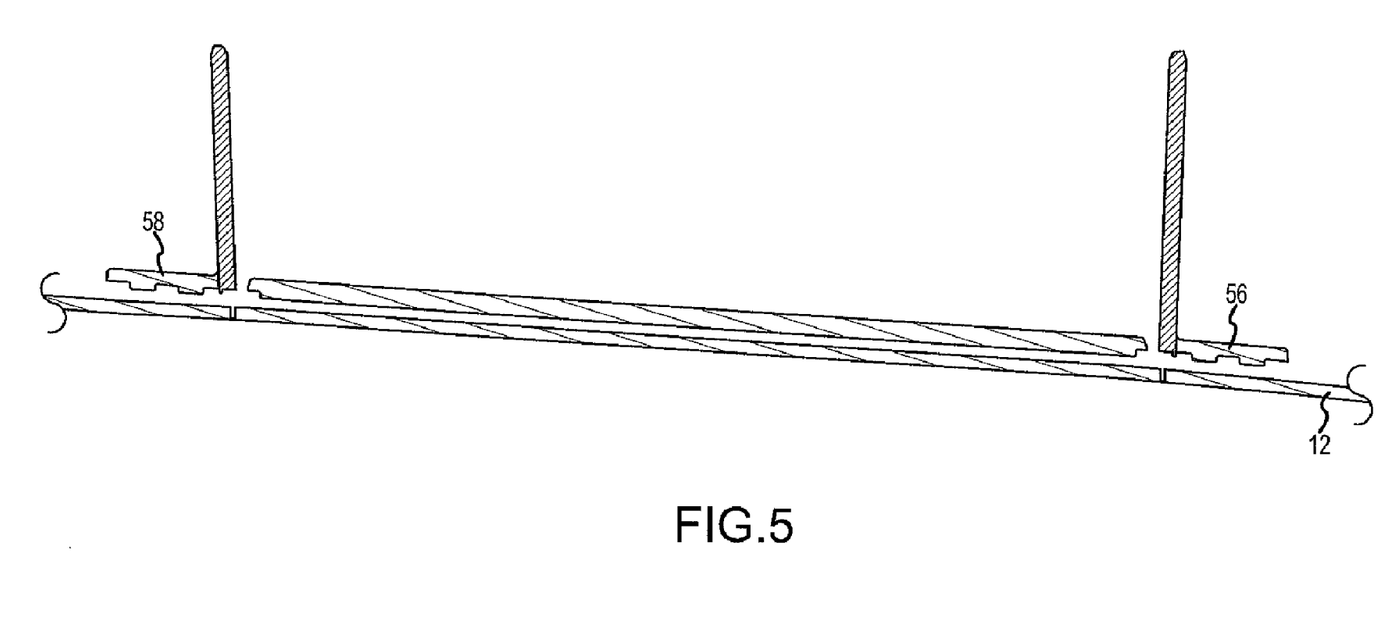
FIG. 5 is a sectional perspective view of an embodiment of the PSIR chute assembly showing the chute flanges.

FIG. 5 is a sectional perspective view of an embodiment of the PSIR chute assembly showing chute flanges 56, 58. FIG. 5 also shows instrument panel 12.

Figure 6:
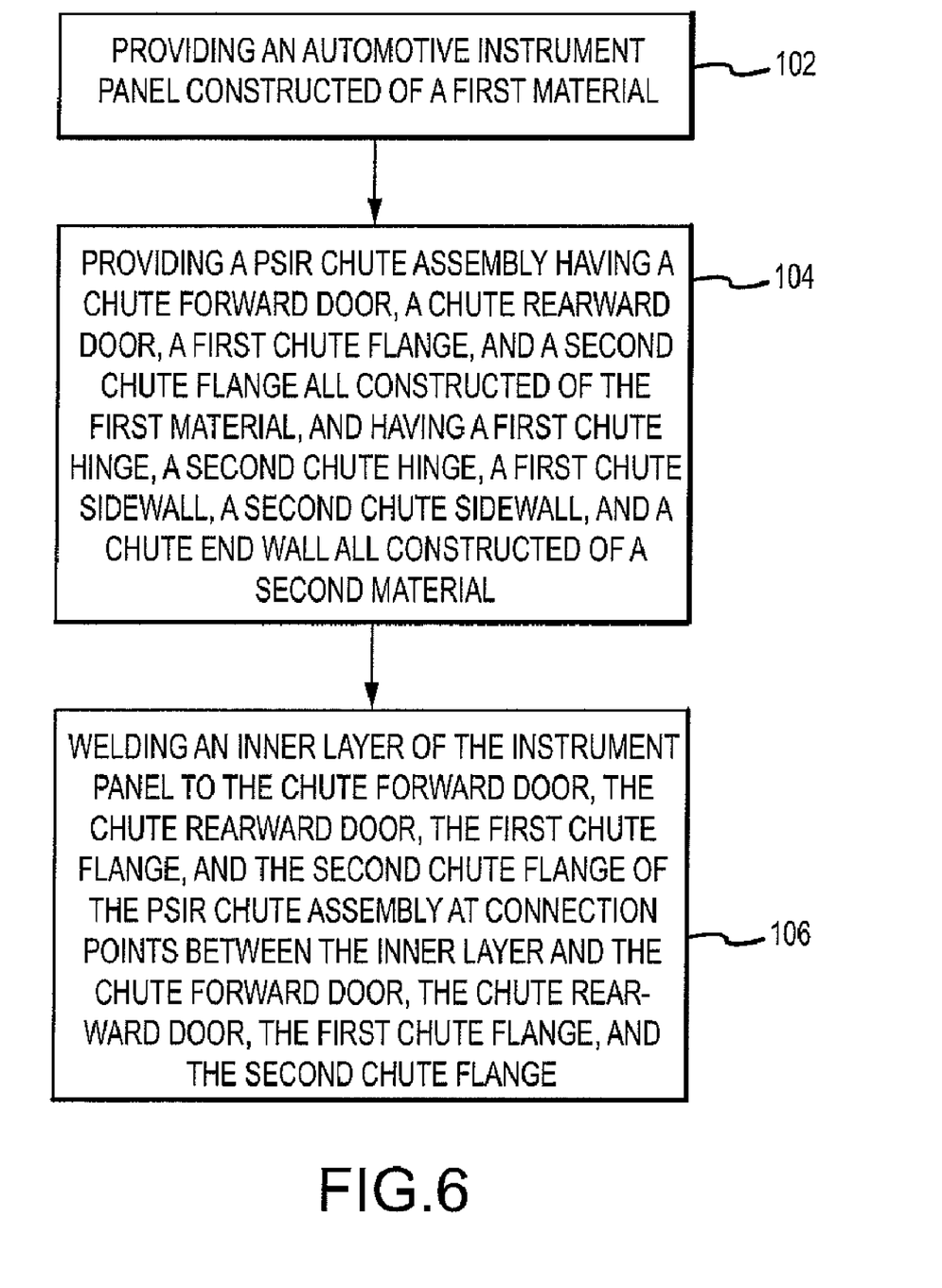
FIG. 6 is a flow diagram of the steps of the method of the invention.

FIG. 6 is a flow diagram of the steps of the method of the invention. In an embodiment as shown in FIG. 6, the invention provides a method 100 of making an automotive instrument panel 12 (see FIG. 4) for eliminating warping, distortion, and compression at connection points 60, 64 (see FIG. 4) between the instrument panel and an automotive Passenger Side Inflatable Restraint (PSIR) hidden chute assembly 50 (see FIG. 4). The method may include step 102 of providing an automotive instrument panel 12 (see FIG. 4) constructed of a first material 42 (see FIG. 4). The method may further include step 104 of providing a PSIR chute assembly 50 (see FIG. 4) having a chute rearward door 52, a chute forward door 54, a first chute flange 56, and a second chute flange 58, all constructed of first material 42, and having a first chute hinge 22, a second chute hinge 24, a first chute sidewall 32a, a second chute sidewall 32b, and a chute end wall 33, all constructed of a second material 44. First material 42 and second material 44 may have different thermal expansion properties and different elastic modulus properties.

In an embodiment, the first material may include thermoplastic polyolefin (TPO), blended polypropylene material, polycarbonate, polyethylene based polyolefin plastic, urethane, or another suitable plastic. In an embodiment, the second material may include a tough ductile material such as a polypropylene or polyethylene blended with rubber or a polycarbonate or another suitable material. The method may further include step 106 of welding an inner layer 40 of instrument panel 12 to chute rearward door 52, chute forward door 54, first chute flange 56, and second chute flange 58 of PSIR chute assembly 50 at connection points 60, 64 between inner layer 40 and chute rearward door 52, chute forward door 54, first chute flange 56, and second chute flange 58, such that connection points 60, 64 evenly resist stress caused by the welding and eliminate any warping and distortion at connection points 60, 64 (see FIG. 4). Additionally, stresses and distortion may result due to any difference in the coefficient of thermal expansion between the materials present at connection points 60, 64 as the ambient temperature changes in service. This stress and distortion is prevented by the innovative use of the same material at connection points 60, 64 and limiting the use of the second material to first chute hinge 22, second chute hinge 24, first chute sidewall 32a, second chute sidewall 32b, and chute end walls 33, where loading is much higher. In an embodiment, the welding may be vibration welding. However, other suitable welding processes may be used.

Although several embodiments of this invention have been described above with a certain degree of particularity, those skilled in the art may make numerous alterations to the disclosed embodiments without departing from the scope of this invention. All directional references (e.g., upper, lower, upward, downward, left, right, leftward, rightward, top, bottom, above, below, vertical, horizontal, clockwise and counterclockwise) are only used for identification purposes to aid the readers understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not as limiting. Changes in detail or structure may be made without departing from the invention as defined in the appended claims.

What is claimed is:

1. An automotive Passenger Side Inflatable Restraint (PSIR) hidden chute assembly contained behind an automotive instrument panel, the chute assembly comprising:
   first and second chute hinges respectively hingedly connected to chute forward and rearward doors, wherein the chute forward and rearward doors are attached to an inner layer of the instrument panel at a first set of connection points;
   a first chute sidewall integral with the first chute hinge and extending down from a top portion of the first chute hinge, a second chute sidewall integral with the second chute hinge and extending down from a top portion of the second chute hinge, and chute end walls connecting the first and second chute sidewalls;
   first and second chute flanges respectively coupled to the top portions of the first and second chute sidewalls, wherein the first and second chute flanges are attached to the inner layer of the instrument panel at a second set of connection points; and,
   wherein the chute forward and rearward doors, the first and second chute flanges, and the instrument panel are all constructed of a first material, and the first and second chute hinges, the first and second chute sidewalls, and the chute end walls are all constructed of a second material, wherein the first and second materials have different thermal expansion properties and different elastic modulus properties.

2. An assembly according to claim 1, wherein the first material is selected from the group consisting of thermoplastic polyolefin (TPO), blended polypropylene material, polycarbonate, polyethylene based polyolefin plastic, and urethane.

3. An assembly according to claim 1, wherein the second material is selected from the group consisting of a tough ductile material, a polypropylene blended with rubber, a polyethylene blended with rubber, and a polycarbonate.

4. A method of making an automotive instrument panel for eliminating warping and distortion, and compression at connection points between the instrument panel and an automotive Passenger Side Inflatable Restraint (PSIR) hidden chute assembly, the method comprising the steps of:
   providing an automotive instrument panel constructed of a first material;
   providing a PSIR chute assembly having chute forward and rearward doors, and first and second chute flanges, all constructed of the first material, and having first and second chute hinges, first and second chute sidewalls, and chute end walls all constructed of a second material, wherein the first and second materials have different thermal expansion properties and different elastic modulus properties; and,
   welding an inner layer of the instrument panel to the chute forward and rearward doors, and the first and second chute flanges of the PSIR chute assembly at connection points between the inner layer and the chute forward and rearward doors, and the first and second chute flanges, such that the connection points resist stress caused by the welding and varying ambient temperatures generally evenly, thus eliminating any warping and distortion at the connection points resulting in visibility on a show surface of an end product.

5. A method according to claim 4, wherein the first material is selected from the group consisting of thermoplastic polyolefin (TPO), blended polypropylene material, polycarbonate, polyethylene based polyolefin plastic, and urethane.

6. A method according to claim 4, wherein the second material is selected from the group consisting of a tough ductile material, a polypropylene blended with rubber, a polyethylene blended with rubber, and a polycarbonate.

7. A method according to claim 4, wherein the welding is vibration welding.

8. An assembly according to claim 1, wherein the assembly is formed by a two shot molding process.

9. An assembly according to claim 8, wherein the two shot molding process includes:
   (a) molding the chute forward and rearward doors and the first and second chute flanges from the first material having a first thermal expansion property and a first elastic modulus property; and
   (b) molding the first and second chute hinges and the first and second chute sidewalls from the second material having a second thermal expansion property and a second elastic modulus property.

10. An assembly according to claim 9, wherein the first thermal expansion property is different than the second thermal expansion property.

11. An assembly according to claim 9, wherein the first elastic modulus property is different than the second elastic modulus expansion property.

12. An assembly according to claim 9, wherein the first thermal expansion property and the first elastic modulus property are identical to the thermal expansion property and the elastic modulus property of the instrument panel.

13. A method according to claim 4, wherein the step of providing a PSIR chute assembly comprises:
   providing a two shot injection molding mold;
   injection molding the first material in the two shot injection molding mold to form the chute forward and rearward doors and the first and second chute flanges; and
   injection molding the second material in the two shot injection molding mold to form the first and second hinges and the first and second chute sidewalls.

14. A method according to claim 4, wherein PSIR chute assembly is formed in a two shot injection molding process.

15. A method according to claim 13, wherein the first material has a first thermal expansion property and a first elastic modulus property; and wherein the second material has a second thermal expansion property and a second elastic modulus property.

16. An assembly according to claim 15, wherein the first thermal expansion property is different than the second thermal expansion property.

17. An assembly according to claim 16, wherein the first elastic modulus property is different than the second elastic modulus expansion property.

18. An assembly according to claim 17, wherein the first thermal expansion property and the first elastic modulus property are identical to the thermal expansion property and the elastic modulus property of the instrument panel.

* * * * *